United States Patent
Hou et al.

(10) Patent No.: US 11,808,351 B2
(45) Date of Patent: Nov. 7, 2023

(54) MECHANICAL UNLOCKING MECHANISM FOR ELECTRONIC PARKING

(71) Applicant: Jing-Jin Electric Technologies Co., Ltd., Beijing (CN)

(72) Inventors: Defeng Hou, Beijing (CN); Ran Sun, Beijing (CN); Jianwen Li, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 17/802,130

(22) PCT Filed: Apr. 8, 2020

(86) PCT No.: PCT/CN2020/083762
§ 371 (c)(1),
(2) Date: Aug. 24, 2022

(87) PCT Pub. No.: WO2021/184454
PCT Pub. Date: Sep. 23, 2021

(65) Prior Publication Data
US 2023/0076082 A1    Mar. 9, 2023

(30) Foreign Application Priority Data
Mar. 17, 2020 (CN) .......................... 202010186938.2

(51) Int. Cl.
*F16H 63/34* (2006.01)
(52) U.S. Cl.
CPC ..... *F16H 63/3425* (2013.01); *F16H 63/3491* (2013.01)
(58) Field of Classification Search
CPC ............. F16H 63/3425; F16H 63/3466; F16H 63/3475; F16H 63/3491
See application file for complete search history.

(56) References Cited

U.S. PATENT DOCUMENTS 3,074,513 A * 1/1963 Robinson ............ F16H 63/3416
188/69
4,369,867 A * 1/1983 Lemieux ................. B60T 1/005
192/219.5
(Continued)

FOREIGN PATENT DOCUMENTS

CN     106439000 A     2/2017
CN     206812976 U    12/2017
(Continued)

OTHER PUBLICATIONS

International Search Report ussued in PCT/CN2020/083762 dated Dec. 16, 2020.
(Continued)

*Primary Examiner* — Stacey A Fluhart
*Assistant Examiner* — Lori Wu
(74) *Attorney, Agent, or Firm* — Fox Rothschild LLP; Carol Thorstad-Forsyth

(57) ABSTRACT

A mechanical unlocking mechanism for electronic parking is provided, which comprises a parking cam assembly, a pawl assembly, a pull rod assembly and a parking gear; the parking cam assembly comprises a parking guide shaft and a parking cam, the parking cam is sleeved on the parking guide shaft, at least a first convex part and a second convex part are provided at two sides of the parking cam, and a connecting part is provided on the second convex part; the pull rod assembly is connected with the parking cam via the connecting part, and the pull rod assembly pulls the second convex part to drive the parking cam to rotate; the parking gear can be fixed or rotatable according to the pawl assembly being in a first position where the parking gear parks in or a second position where the parking gear parks out as the parking cam rotates.

13 Claims, 2 Drawing Sheets

(56) References Cited

U.S. PATENT DOCUMENTS

| | | | | |
|---|---|---|---|---|
| 5,170,869 A | * | 12/1992 | Svab | ........................ B60T 1/005 |
| | | | | 192/219.5 |
| 6,481,556 B1 | * | 11/2002 | Haupt | .................. F16H 63/3491 |
| | | | | 192/219.5 |
| 2011/0146439 A1 | * | 6/2011 | Saitner | ................ F16H 63/3491 |
| | | | | 74/473.25 |
| 2014/0346004 A1 | * | 11/2014 | Landino | .............. F16H 63/3433 |
| | | | | 192/219.5 |
| 2015/0308571 A1 | * | 10/2015 | Wyatt | ................. F16H 63/3491 |
| | | | | 192/219.5 |
| 2020/0248806 A1 | * | 8/2020 | Klein | .................. F16H 63/3433 |

FOREIGN PATENT DOCUMENTS

| | | | | |
|---|---|---|---|---|
| CN | 107606146 A | 1/2018 | | |
| CN | 108980344 A | 12/2018 | | |
| CN | 210034381 | 2/2020 | | |
| CN | 210034382 U | 2/2020 | | |
| DE | 102007007681 A1 | 8/2008 | | |
| JP | H05-322043 | * 12/1993 | ............. | F16H 63/34 |
| JP | 5322043 | 10/2013 | | |
| WO | 2011090614 A2 | 7/2011 | | |

OTHER PUBLICATIONS

Communication pursuant to Article 94(3) EPC for European Patent Application No. 20 925 824.3 dated Jun. 16, 2023 (10 pages).

* cited by examiner

MECHANICAL UNLOCKING MECHANISM FOR ELECTRONIC PARKING

CROSS-REFERENCES TO RELATED APPLICATION

This application is a U.S. National Stage entry under 35 U.S.C. § 371 based on International Application No. PCT/CN2020/083762, filed on Apr. 8, 2020, which claims priority to Chinese patent application No. 202010186938.2 which was filed on Mar. 17, 2020 and is entitled "MECHANICAL UNLOCKING MECHANISM FOR ELECTRONIC PARKING". The content of the priority applications are hereby incorporated herein in their entirety by reference.

TECHNICAL FIELD

The present disclosure relates to the field of parking control, and more particularly, to a mechanical unlocking mechanism for electronic parking.

BACKGROUND

The electronic parking mechanism of gearbox is a mechanism for preventing the vehicle from sliding forward or sliding backward when the vehicle is parked on a road or a ramp. At present, most electronic parking mechanisms of gearbox in new energy vehicles have insufficient structural flexibility and short service life. Moreover, the mechanical unlocking mechanism is provided at the worm of the parking motor; when the parking motor is powered off, this unlocking method requires the driver to operate under the vehicle to perform mechanical unlocking, and thus has low safety and poor comfort.

SUMMARY

In view of the above problems, the present disclosure provides a mechanical unlocking mechanism for electronic parking to solve or partially solve the above problems.

In order to achieve the above object, the present disclosure adopts the following technical solutions.

The present disclosure provides a mechanical unlocking mechanism for electronic parking, comprising: a parking cam assembly, a pawl assembly, a pull rod assembly and a parking gear;
  the parking cam assembly comprises a parking guide shaft and a parking cam, the parking cam is sleeved on the parking guide shaft, at least a first convex part and a second convex part are provided at two sides of the parking cam, and a connecting part is provided on the second convex part;
  the pawl assembly comprises a pawl, and one end of the pawl assembly abuts against the first convex part;
  the pull rod assembly is connected with the parking cam via the connecting part, and the pull rod assembly pulls the second convex part to drive the parking cam to rotate; and
  the parking gear can be fixed or rotatable according to the pawl assembly being in a first position where the parking gear parks in or a second position where the parking gear parks out as the parking cam rotates.

Further, the connecting part is a slot, the slot is a through slot or a blind slot, and the slot is arc-shaped, circular-shaped or polygonal-shaped.

Further, the pull rod assembly comprises a connecting rod, a pin and a washer;
  one end of the connecting rod is installed in the slot via the pin, and the washer is provided on an outer side of a contact portion of the pin with the connecting rod to fix the pin; and
  the parking cam is driven to rotate by pulling the connecting rod.

Further, the pull rod assembly further comprises a pull rod and a sealing ring;
  the pull rod is installed in a guide hole leading to outside of the gearbox casing with a clearance fit, and the sealing ring is arranged between the pull rod and the gearbox casing; and
  one end of the pull rod is movably connected with the connecting rod via a pin, and a washer is provided on an outer side of a contact portion of the pin with the connecting rod and the pull rod to fix the pin.

Further, the first convex part is provided with an arc protrusion in a circumferential direction, the arc protrusion is in contact with the pawl assembly, and the parking cam assembly further comprises an axial position-limiting block, a parking cam position-limiting plate, and a paddle spring;
  the parking cam position-limiting plate is fixed on the parking guide shaft, the axial position-limiting block is sleeved on the parking guide shaft with an interference fit, the parking cam is sleeved on the parking guide shaft between the axial position-limiting block and the parking cam position-limiting plate, and the parking cam position-limiting plate can drive the parking cam to rotate; and
  the paddle spring provides a return force after mechanical unlocking and a continuous power during parking.

Further, the pawl assembly further comprises a roller and a roller pin; and
  a distal end of the pawl is provided with a groove, the roller is fixed in the groove via the roller pin, the roller abuts against the first convex part, and a lower part of the pawl is provided with a boss that can engage with the parking gear.

Further, the pawl assembly further comprises a pawl shaft and a torsion spring, the pawl shaft is arranged on one side of the pawl, and the pawl can swing around the pawl shaft;
  the one side of the pawl is sleeved on the pawl shaft, the pawl shaft is fixed on two sides of the gearbox casing, and the pawl can rotate around the pawl shaft; and
  one end of the torsion spring is fixed on the gearbox casing, and the other end is fixed on the pawl, so that the pawl is preloaded on the parking cam.

Further, the mechanical unlocking mechanism further comprises a torsion spring failure prevention assembly, the torsion spring failure prevention assembly comprises a guide pin and a guide slot, the guide pin is arranged at an end of a guide part at the distal end of the pawl, the guide slot is arranged on the parking cam and/or the parking cam position-limiting plate, and the guide pin extends into the guide slot.

The above mechanical unlocking mechanism for electronic parking has the following advantages.

The mechanical unlocking mechanism according to the present disclosure can provide an emergent mechanical unlocking function when the parking motor is powered off. The parking cam is connected with the control part in the cab via the pull rod assembly, so that the driver can mechanically unlock in the cab. As the mechanical unlocking mechanism can realize the pure mechanical unlocking in the cab without power supply, the driver does not need to get off the vehicle for operation, so it has high safety performance and good operation comfort. The mechanical unlocking mechanism according to the present disclosure, by providing the torsion spring failure prevention assembly, can still realize parking unlocking in case of torsion spring failure, and can effectively prevent the pawl from falling into the parking gear groove in the non-parking state.

The above is only an overview of the technical solutions of the present disclosure. In order to better understand the technical means of the present disclosure so that it can be implemented according to the contents of the description, and in order to make the above and other objects, features and advantages of the present disclosure more obvious and easy to understand, the specific embodiments of the present disclosure are given below.

Figure 1:
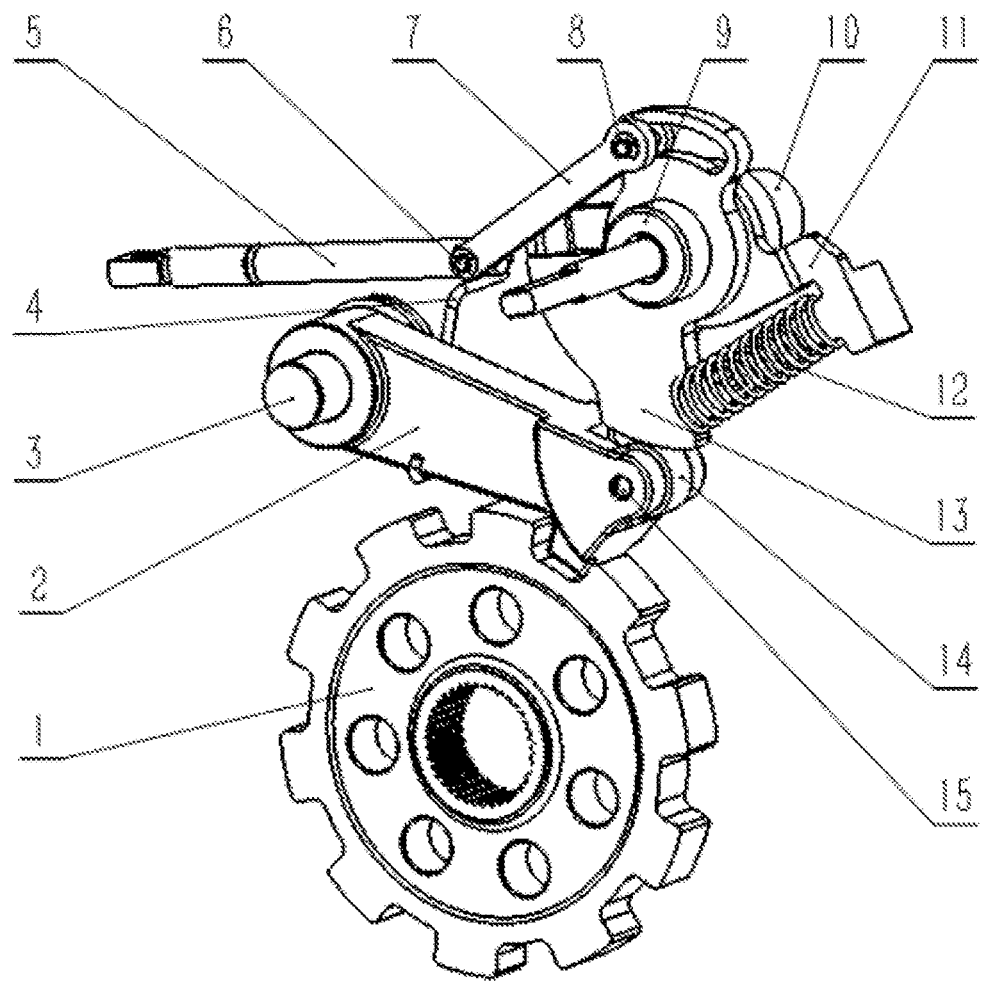
FIG. 1 is a schematic view of the structure of a mechanical unlocking mechanism for electronic parking according to an embodiment of the present disclosure.

In the drawings: 1. parking gear, 2. pawl, 3. pawl shaft, 4. torsion spring, 5. pull rod, 6. pin, 7. connecting rod, 8. washer, 9. axial position-limiting block, 10. parking guide shaft, 11. parking cam position-limiting plate, 12. paddle spring, 13. parking cam, 14. roller, 15. roller pin.

DETAILED DESCRIPTION

Illustrative embodiments of the present disclosure will be described in more detail with reference to the drawings. Although the drawings show the illustrative embodiments of the present disclosure, it should be understood that the present disclosure can be implemented in various ways and should not be limited by the embodiments disclosed herein. On the contrary, the embodiments are provided for a more thorough and complete understanding of the present disclosure, so as to fully convey the scope of the present disclosure to those skilled in the art.

As shown in FIG. 1, the present disclosure provides a mechanical unlocking mechanism for electronic parking, which comprises a parking cam assembly, a pawl assembly, a pull rod assembly and a parking gear 1.

Specifically, the parking cam assembly comprises a parking guide shaft 10 and a parking cam 13, the parking cam 13 is sleeved on the parking guide shaft 10, at least a first convex part and a second convex part are arranged on two sides of the parking cam 13, and a connecting part is arranged on the second convex part. One end of the parking guide shaft 10 is a flat shaft and the other end is a circular-shaped shaft. The parking guide shaft 10 runs through the gearbox casing. The flat shaft end of the parking guide shaft 10 is connected with the parking motor, and the parking motor drives the parking guide shaft 10 to rotate.

The pawl assembly comprises a pawl 2, and one end of the pawl assembly abuts against the first convex part.

The pull rod assembly is connected with the parking cam 13 via the connecting part. The pull rod assembly pulls the second convex part to drive the parking cam 13 to rotate.

The parking gear 1 can be fixed or rotatable according to the pawl assembly being in a first position where the parking gear 1 parks in or a second position where the parking gear 1 parks out as the parking cam 13 rotates. As the parking cam 13 rotates, different positions of the first convex part abut against the pawl assembly, so that the pawl assembly is in the first position where the parking gear 1 parks in or the second position where the parking gear 1 parks out.

In sum, the mechanical unlocking structure in the embodiment of the present disclosure can provide a mechanical unlocking mode when the parking motor loses power and cannot realize parking unlocking. The pull rod assembly drives the parking cam 13 to rotate, so that the position relationship between the parking pawl assembly and the parking gear 1 is changed from the first position of parking-in to the second position of parking-out, thereby realizing the parking unlocking. The mechanical unlocking mechanism according to this embodiment does not need to perform mechanical unlocking under the vehicle, and it has the advantages of simple operation, high safety and good comfort.

In an embodiment, the connecting part is a slot, the slot is a through slot or a blind slot, and the slot is arc-shaped, circular-shaped or polygonal-shaped.

Figure 2:
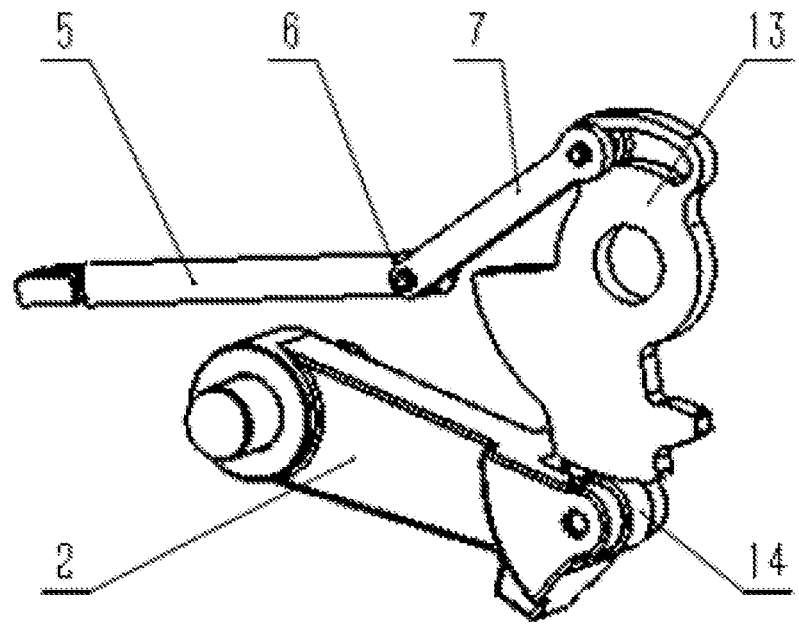
FIG. 2 is a schematic view of the structure of a parking cam and a pawl in the parking-in state according to an embodiment of the present disclosure.

In an embodiment, as shown in FIG. 2, the pull rod assembly comprises a connecting rod 7, a pin 6, and a washer 8.

One end of the connecting rod 7 is installed in the slot via the pin 6. The connecting rod 7 is movably connected with the parking cam 13. The washer 8 is arranged on an outer side of a contact portion of the pin 6 with the connecting rod 7 to fix the pin 6.

The parking cam 13 is driven to rotate by pulling the connecting rod 7.

In an embodiment, the pull rod assembly further comprises a pull rod 5 and a sealing ring.

The pull rod 5 is installed on a guide hole leading to the outside of the gearbox casing with a clearance fit. The sealing ring is arranged between the pull rod 5 and the gearbox casing. One end of the pull rod 5 is movably connected with the connecting rod 7 via a pin 6, and the washer is provided on an outer side of a contact portion of the pin 6 with the connecting rod 7 and the pull rod 5 to fix the pin 6. One end of the pull rod 5 is movably connected with the connecting rod 7 via the pin 6, and the other end of the pull rod 5 is connected to the control part in the cab via the vehicle pull wire or the vehicle pull rod. In the cab, the driver pulls the pull rod 5 via the control part to realize the rotation of the parking cam 13 and realize the mechanical unlocking.

Figure 3:
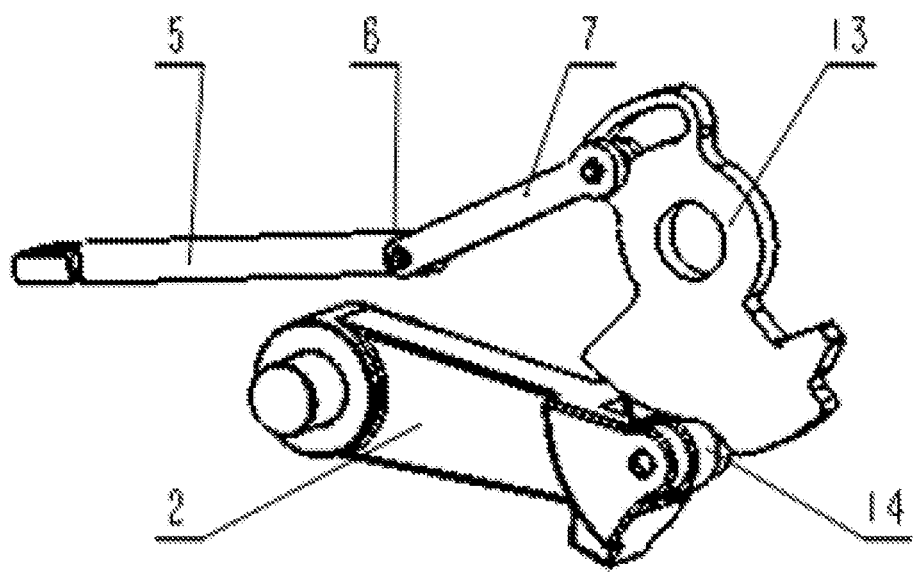
FIG. 3 is a schematic view of the structure of the parking cam and pawl after mechanically unlocked according to an embodiment of the present disclosure.

In an embodiment, the first convex part is provided with an arc protrusion in the circumferential direction, and the arc protrusion is in contact with the pawl assembly. When the arc protrusion abuts against the pawl assembly, the pawl assembly is pressed down and engaged with the parking gear 1 to realize parking-in. At this time, the positions and structure of the parking cam 13 and the pawl 2 are shown in FIG. 2. When other portion of the first convex part except the arc protrusion abuts against the pawl assembly, the pawl assembly is lift up and is separated from the parking gear 1 to realize parking-out. The positions and structure of the parking cam 13 and the pawl 2 at this moment are shown in FIG. 3. The parking cam assembly further comprises an axial position-limiting block 9, a parking cam position-limiting plate 11, and a paddle spring 12.

The parking cam position-limiting plate 11 is fixed on the parking guide shaft 10, the axial position-limiting block 9 is sleeved on the parking guide shaft 10 with an interference fit, the parking cam 13 is sleeved on the parking guide shaft 10 between the axial position-limiting block 9 and the parking cam position-limiting plate 11, and the parking cam position-limiting plate 11 can drive the parking cam 13 to rotate.

The paddle spring provides the return force after mechanical unlocking and the continuous power during parking. As shown in FIG. 1, the parking cam position-limiting plate 11 comprises at least a first blade part and a second blade part provided with an interval therebetween, the first blade part and the second blade part are respectively provided on two sides of the first convex part of the parking cam 13; the side of the first blade part that faces the first convex part is provided thereon with a first spring column, the first convex part is provided thereon with a corresponding second spring column, and a paddle spring 12 is sleeved on the first spring column and the second spring column; the second blade part is formed with a curved claw, and the curved claw abuts against the other side of the first convex part.

In an embodiment, the pawl assembly further comprises a roller 14 and a roller pin 15.

Specifically, the distal end of the pawl 2 is provided with a groove, the roller 14 is fixed in the groove via the roller pin 15, the roller 14 abuts against the first convex part, and the lower part of the pawl 2 is provided with a boss to engage with the parking gear 1. The roller 14 can roll around the roller pin 15. The roller 14 is provided to reduce the friction and wear of the joint between the upper part of the pawl 2 and the parking cam 13 and improve its service life.

In an embodiment, the pawl assembly further comprises a pawl shaft 3 and a torsion spring 4. The pawl shaft 3 is arranged on one side of the pawl 2, and the pawl 2 can swing around the pawl shaft 3.

The one side of the pawl 2 is sleeved on the pawl shaft 3, the pawl shaft 3 is fixed on two sides of the gearbox casing, and the pawl 2 can rotate around the pawl shaft 3. One end of the torsion spring 4 is fixed on the gearbox casing, and the other end is fixed on the pawl 2, so that the pawl 2 is preloaded on the parking cam 13. Under the action of the torsion spring 4, the pawl 2 always abuts against the parking cam 13.

In an embodiment, the mechanical unlocking mechanism further comprises a torsion spring failure prevention assembly. The torsion spring failure prevention assembly comprises a guide pin and a guide slot, the guide pin is arranged at an end of a guide part at the distal end of the pawl 2, the guide slot is arranged on the parking cam 13 and/or the parking cam position-limiting plate 11, the guide pin extends into the guide slot, and the guide slot provides a guiding function to lift up the pawl 2 in case of emergency unlocking. When the torsion spring 4 fails, the pawl assembly loses the preload force from the torsion spring 4, and thus when the parking unlocking is performed, the boss provided at the lower part of the pawl 2 cannot be disengaged from the parking gear 1, and the parking unlocking cannot be realized.

In this embodiment of the present disclosure, by providing the guide pin and the guide slot, the pawl 2 can be movably connected with the parking cam 13. Even if the torsion spring 4 fails, due to the rotation of the parking cam 13, the guide pin drives the pawl 2 to lift up so that the boss at the lower part of the pawl 2 is separated from the parking gear 1, thereby realizing the parking unlocking. In the non-parking state, the guide pin abuts against the bottom of the guide slot of the parking cam 13 to prevent the pawl 2 from falling into the tooth groove of the parking gear 1. In this embodiment, the torsion spring failure prevention assembly overcomes the problem that the parking cannot be unlocked normally due to the failure of torsion spring 4.

In sum, the present disclosure provides a mechanical unlocking mechanism for electronic parking, which comprises a parking cam assembly, a pawl assembly, a pull rod assembly and a parking gear; the parking cam assembly comprises a parking guide shaft and a parking cam, the parking cam is sleeved on the parking guide shaft, at least a first convex part and a second convex part are provided at two sides of the parking cam, and a connecting part is provided on the second convex part; the pawl assembly comprises a pawl, and one end of the pawl assembly abuts against the first convex part; the pull rod assembly is connected with the parking cam via the connecting part, and the pull rod assembly pulls the second convex part to drive the parking cam to rotate; the parking gear can be fixed or rotatable according to the pawl assembly being in a first position where the parking gear parks in or a second position where the parking gear parks out as the parking cam rotates. The mechanical unlocking mechanism according to the present disclosure provides an emergent mechanical unlocking function when the parking motor is powered off. The parking cam is connected with the control part in the cab via the pull rod assembly, so that the driver can mechanically unlock in the cab. As the mechanical unlocking mechanism can realize the pure mechanical unlocking in the cab without power supply, the driver does not need to get off the vehicle for operation, so it has high safety performance and good operation comfort.

The above merely describes particular embodiments of the present disclosure. By the teaching of the present disclosure, a person skilled in the art can make other modifications or variations based on the above embodiments. A person skilled in the art should appreciate that, the detailed description above is only for the purpose of better explaining the present disclosure, and the protection scope of the present disclosure should be subject to the protection scope of the claims.

What is claimed is:

1. A mechanical unlocking mechanism for electronic parking, comprising: a parking cam assembly, a pawl assembly, a pull rod assembly and a parking gear;
   the parking cam assembly comprises a parking guide shaft and a parking cam, the parking cam is sleeved on the parking guide shaft, at least a first convex part and a second convex part are provided at two sides of the parking cam, and a connecting part is provided on the second convex part;
   the pawl assembly comprises a pawl, and one end of the pawl assembly abuts against the first convex part;
   the pull rod assembly is connected with the parking cam via the connecting part, and the pull rod assembly pulls the second convex part to drive the parking cam to rotate; and
   the parking gear can be fixed or rotatable according to the pawl assembly being in a first position where the parking gear parks in or a second position where the parking gear parks out as the parking cam rotates.

2. The mechanical unlocking mechanism according to claim 1, wherein the connecting part is a slot, the slot is a through slot or a blind slot, and the slot is arc-shaped, circular-shaped or polygonal-shaped.

3. The mechanical unlocking mechanism according to claim 2, wherein the pull rod assembly comprises a connecting rod, a pin and a washer;

one end of the connecting rod is installed in the slot via the pin, and the washer is provided on an outer side of a contact portion of the pin with the connecting rod to fix the pin; and the parking cam is driven to rotate by pulling the connecting rod.

4. The mechanical unlocking mechanism according to claim 3, wherein the pull rod assembly further comprises a pull rod and a sealing ring;

the pull rod is installed in a guide hole leading to outside of the gearbox casing with a clearance fit, and the sealing ring is arranged between the pull rod and the gearbox casing; and one end of the pull rod is movably connected with the connecting rod via the pin, and the washer is provided on an outer side of a contact portion of the pin with the connecting rod and the pull rod to fix the pin.

5. The mechanical unlocking mechanism according to claim 4, wherein the pawl assembly further comprises a roller and a roller pin; and a distal end of the pawl is provided with a groove, the roller is fixed in the groove via the roller pin, the roller abuts against the first convex part, and a lower part of the pawl is provided with a boss that can engage with the parking gear.

6. The mechanical unlocking mechanism according to claim 4, wherein the pawl assembly further comprises a pawl shaft and a torsion spring, the pawl shaft is arranged on one side of the pawl, and the pawl can swing around the pawl shaft;

the one side of the pawl is sleeved on the pawl shaft, the pawl shaft is fixed on two sides of the gearbox casing, and the pawl can rotate around the pawl shaft; and one end of the torsion spring is fixed on the gearbox casing, and the other end is fixed on the pawl, so that the pawl is preloaded on the parking cam.

7. The mechanical unlocking mechanism according to claim 3, wherein the pawl assembly further comprises a roller and a roller pin; and a distal end of the pawl is provided with a groove, the roller is fixed in the groove via the roller pin, the roller abuts against the first convex part, and a lower part of the pawl is provided with a boss that can engage with the parking gear.

8. The mechanical unlocking mechanism according to claim 3, wherein the pawl assembly further comprises a pawl shaft and a torsion spring, the pawl shaft is arranged on one side of the pawl, and the pawl can swing around the pawl shaft;

the one side of the pawl is sleeved on the pawl shaft, the pawl shaft is fixed on two sides of the gearbox casing, and the pawl can rotate around the pawl shaft; and one end of the torsion spring is fixed on the gearbox casing, and the other end is fixed on the pawl, so that the pawl is preloaded on the parking cam.

9. The mechanical unlocking mechanism according to claim 2, wherein the pawl assembly further comprises a roller and a roller pin; and a distal end of the pawl is provided with a groove, the roller is fixed in the groove via the roller pin, the roller abuts against the first convex part, and a lower part of the pawl is provided with a boss that can engage with the parking gear.

10. The mechanical unlocking mechanism according to claim 2, wherein the pawl assembly further comprises a pawl shaft and a torsion spring, the pawl shaft is arranged on one side of the pawl, and the pawl can swing around the pawl shaft;

the one side of the pawl is sleeved on the pawl shaft, the pawl shaft is fixed on two sides of the gearbox casing, and the pawl can rotate around the pawl shaft; and one end of the torsion spring is fixed on the gearbox casing, and the other end is fixed on the pawl, so that the pawl is preloaded on the parking cam.

11. The mechanical unlocking mechanism according to claim 1, wherein the first convex part is provided with an arc protrusion in a circumferential direction, the arc protrusion is in contact with the pawl assembly, and the parking cam assembly further comprises an axial position-limiting block, a parking cam position-limiting plate, and a paddle spring;

the parking cam position-limiting plate is fixed on the parking guide shaft, the axial position-limiting block is sleeved on the parking guide shaft with an interference fit, the parking cam sleeve is sleeved on the parking guide shaft between the axial position-limiting block and the parking cam position-limiting plate, and the parking cam position-limiting plate can drive the parking cam to rotate; and the paddle spring provides a return force after mechanical unlocking and a continuous power during parking.

12. The mechanical unlocking mechanism according to claim 1, wherein the pawl assembly further comprises a roller and a roller pin; and a distal end of the pawl is provided with a groove, the roller is fixed in the groove via the roller pin, the roller abuts against the first convex part, and a lower part of the pawl is provided with a boss that can engage with the parking gear.

13. The mechanical unlocking mechanism according to claim 1, wherein the pawl assembly further comprises a pawl shaft and a torsion spring, the pawl shaft is arranged on one side of the pawl, and the pawl can swing around the pawl shaft;

the one side of the pawl is sleeved on the pawl shaft, the pawl shaft is fixed on two sides of the gearbox casing, and the pawl can rotate around the pawl shaft; and one end of the torsion spring is fixed on the gearbox casing, and the other end is fixed on the pawl, so that the pawl is preloaded on the parking cam.

\* \* \* \* \*